US 8,713,518 B2

(12) United States Patent
Pointer et al.

(10) Patent No.: US 8,713,518 B2
(45) Date of Patent: Apr. 29, 2014

(54) SYSTEM AND METHOD FOR COMPUTATIONAL UNIFICATION OF HETEROGENEOUS IMPLICIT AND EXPLICIT PROCESSING ELEMENTS

(75) Inventors: David Pointer, Colorado Springs, CO (US); David E. Caliga, Fort Worth, TX (US)

(73) Assignee: SRC Computers, LLC, Colorado Springs, CO (US)

( * ) Notice: Subject to any disclaimer, the term of this patent is extended or adjusted under 35 U.S.C. 154(b) by 356 days.

(21) Appl. No.: 13/287,322

(22) Filed: Nov. 2, 2011

(65) Prior Publication Data
US 2012/0117535 A1  May 10, 2012

Related U.S. Application Data

(60) Provisional application No. 61/412,124, filed on Nov. 10, 2010.

(51) Int. Cl.
*G06F 9/44* (2006.01)

(52) U.S. Cl.
USPC ........................................... 717/106

(58) Field of Classification Search
CPC .............. G06F 8/30; G06F 8/20; G06F 8/36
USPC .................... 717/106–108, 141–143
See application file for complete search history.

(56) References Cited

U.S. PATENT DOCUMENTS

| | | | | |
|---|---|---|---|---|
| 5,699,310 A | * | 12/1997 | Garloff et al. ............... | 717/108 |
| 2006/0031591 A1 | * | 2/2006 | Hollstrom et al. ........... | 709/250 |
| 2006/0101432 A1 | * | 5/2006 | Simons et al. ............... | 717/138 |
| 2007/0283337 A1 | | 12/2007 | Kasahara et al. | |
| 2008/0229298 A1 | | 9/2008 | O'Brien et al. | |
| 2008/0244239 A1 | * | 10/2008 | DeWitt et al. ................. | 712/220 |
| 2011/0276787 A1 | * | 11/2011 | Koga et al. ................... | 712/215 |
| 2011/0296381 A1 | * | 12/2011 | Mooney ........................ | 717/122 |

FOREIGN PATENT DOCUMENTS

| | | |
|---|---|---|
| EP | 1 569 104 A2 | 8/2005 |
| EP | 1 569 104 A3 | 5/2006 |
| EP | 1 901 165 A2 | 3/2008 |

OTHER PUBLICATIONS

HMPP Workbench, A Many-Core Programming Environment, A Directive-based Multi-language and Multi-target Hybrid Programming Model supporting OpenHMPP and OpenACC standards, on-line product description at http://www.caps-enterprise.com/fr/page/index.php?id=49&p_p=36, pp. 2, May 18, 2012.
European Search Report on European Patent Application EP 11 18 8402.9, received Apr. 16, 2012, pp. 6.

* cited by examiner

*Primary Examiner* — Anna Deng
(74) *Attorney, Agent, or Firm* — William J. Kubida; Peter J. Meza; Hogan Lovells US LLP

(57) ABSTRACT

A system and method for computational unification of heterogeneous implicit and explicit processing elements which supports the aggregation of any number of such processing elements. The system and method of the present invention supports the generation of a unified executable program through the use of directive statements which are analyzed in conjunction with the semantic structures in the parsed source code to generate appropriate source code targeted to the implicit and explicit processing elements. The computational unification system and method of the present invention further embodies expertise with the particular programming style and idiom of the various processing elements.

4 Claims, 14 Drawing Sheets

SYSTEM AND METHOD FOR COMPUTATIONAL UNIFICATION OF HETEROGENEOUS IMPLICIT AND EXPLICIT PROCESSING ELEMENTS

CROSS REFERENCE TO RELATED PATENT APPLICATIONS

The present invention is related to, and claims priority from, U.S. Provisional Patent Application 61/412,124 filed Nov. 10, 2010, the disclosure of which, inclusive of all patents and documents incorporated therein by reference, is herein specifically incorporated by reference in its entirety.

COPYRIGHT NOTICE/PERMISSION

A portion of the disclosure of this patent document contains material which is subject to copyright protection. The copyright owner has no objection to the facsimile reproduction by anyone of the patent document of the patent disclosure as it appears in the United States Patent and Trademark Office patent file or records, but otherwise, reserves all copyright rights whatsoever. The following notice applies to the software and data and described below, inclusive of the drawing figures where applicable: Copyright© 2011, SRC Computers LLC.

BACKGROUND OF THE INVENTION

The present invention relates, in general, to the field of heterogeneous computer systems. More particularly, the present invention relates to a system and method for computational unification of heterogeneous implicit and explicit processing elements.

Often times the unification of various elements can lead to a new element that is superior to what can be accomplished with any number of the primary elements. Such is the case in the field of computation. SRC Computers, LLC, assignee of the present invention, has discovered that the unification of both implicit and explicit processing elements can have many benefits. Unification is not simply the existence of the two processing forms in a single system. It also encompasses aspects of the system including scalability, data movement, interconnect, aggregation and programmability.

Unification refers to, but is not limited to, the generation of a set of one or more related executable programs that are executed on a heterogeneous processor system. This set of related executable programs for a heterogeneous system is generated from the source code of one type of processor. For example, microprocessor source code for a computer application is submitted to the unification process and method that generates unified source code for a heterogeneous system containing both microprocessor and FPGA-based processor elements. Microprocessor compilation tools take the generated unified microprocessor source code and create the microprocessor executable program while the FPGA-based processor compilation tools take the generated unified FPGA-based processor source code and create the FPGA-based processor executable program. Both executable programs are cooperatively executed on the heterogeneous system.

Microprocessor clock rates (and therefore performance) can no longer increase due to the extreme heat generated at the highest clock rates. In order to provide at least the illusion of higher performance, microprocessor manufacturers turned to lowering clock rates and increasing the number of microprocessor cores on a single chip. This has yielded less than a linear execution performance improvement: 2 cores performing at 1.5 times the performance of 1 core, 4 cores performing at 3 times 1 core, and so on.

It is also more difficult to program a multi-core microprocessor than it is to program a single microprocessor. The blind approach of programming each core as if it were a single microprocessor does not perform well, as each core competes for the shared resources on a multi-core chip. Developers must turn to parallel programming using threads, OpenMP and other techniques, none of which are as easy as serially programming a single microprocessor.

In an attempt to improve overall system performance beyond the limit offered by multi-core microprocessors, many developers turned to a performance accelerator co-processor design paradigm. In this design approach, a processor element with good performance characteristics for a portion of an application program is coupled to a microprocessor through some type of existing input/output (I/O) bus interconnect. The microprocessor is in charge of application execution, drives data transfers, and determines when and how the accelerator co-processor works on its portion of the application's data. Examples of these accelerator co-processor elements include graphic processing units (GPUs), field programmable gate arrays (FPGAs) and application specific integrated circuits (ASICs). However, this type of system design rarely yields good overall application performance for two reasons. Firstly, the time consumed moving data between the microprocessor and its accelerator co-processor negates any performance gains in the co-processor, and secondly this type of system design is not scalable as the co-processor elements have to work through the microprocessor in order to cooperate.

These hybrid co-processor systems have the same programming difficulty inherent in multi-core microprocessors as well as additional complexity introduced by the need to program different types of processor elements. Different types of processor elements have different programming models, idiom for efficient code generation and different programming languages.

To avoid the performance limitations in the accelerator co-processor design model, SRC Computers designed a high bandwidth, scalable system interconnect that supports any number and mix of heterogeneous processor elements. Because of the interconnect design, all processor elements regardless of type cooperate as peers (as opposed to the hierarchical co-processor model) executing an application program. The SRC system design greatly improves overall system execution performance well beyond that offered by multi-core microprocessors or accelerator co-processor designs.

However, existing systems enabling processor element peer cooperation have not heretofore been able to achieve system-wide computational unification and current designs exhibited the essentially the same programming complexity inherent in the accelerator co-processor model.

SUMMARY OF THE INVENTION

The present invention advantageously provides a system and method for computational unification of heterogeneous implicit and explicit processing elements. The computational unification process of the present invention removes the complexity inherent in the accelerator and co-processor model and allows programmers to easily access the high performance inherent in existing systems, thus creating a computationally unified computer system.

Computational unification supports the aggregation of any number of heterogeneous implicit or explicit processing elements. These processing elements may be any number and/or type of implicit or explicit computational device or subsystem, including microprocessors, GPUs, standalone FPGAs, FPGA based reconfigurable processors, ASICs, and so on. These different processing elements may be programmed using various programming languages or methods such as threads, OpenMP, explicit compilation for reconfigurable elements, OpenCL, MATLAB, C, FORTRAN, and so on. Any number of implicit or explicit computational elements may be aggregated into any type of heterogeneous computation system, from a single unified workstation up through large scale networked cluster computing and even to large scale distributed computing (e.g., Cloud and Grid computing). Computational unification incorporates state of the art professional expertise and domain knowledge for each implicit or explicit processing element's unique idiom and style, and so obviates the need for a programmer to become an expert with each processing element.

A high-performance computer system is only an assemblage of hardware unless a means exists to programmatically access the potential performance within the hardware. This need becomes even more pronounced when the system comprises several types of implicit and explicit processor elements, each with its own programming style, idiom and language. These often require specialized, obtuse and complicated programming techniques of which the average programmer may be unaware.

Computational unification generates unified source code programs for any number of types of implicit and/or explicit processing elements from a single source code program through the use of directive statements. The computational unifier analyzes semantic structures in the parsed source code and the programmer-inserted directives to generate appropriate source code targeted at any number of implicit and/or explicit processor elements. The directives contain parameters that direct the creation of various portions of the generated source code.

Expertise with each implicit or explicit processing element's programming style and idiom is embodied in the computational unifier. The original application source code is unified using the same techniques, idiom and style an experienced programmer would utilize for any given implicit or explicit processor element. This enables efficient and high-performance programming for each type of implicit and/or explicit processor element. One example of efficient programming is automating parallelization of the original application source code using a priori knowledge of processor elements, state of the art expertise embodied in the computational unifier's analysis, and the semantic structures and parameterized directives in the original source code.

The computational unification source code analysis also embodies programming expertise in the form of providing specific hints and suggestions to the programmer. These hints and suggestions are generated using a priori knowledge of processor elements, state of the art expertise embodied in the computational unifier's analysis, and the semantic structures and parameterized directives in the original source code. This enables programmers to make guided choices in heterogeneous system trade-offs (e.g., amount of execution parallelization vs. system resource utilization, data movement hints for a given system interconnect, and the like)

Application software source code written in a language with a very high level of abstraction (e.g., Python, MATLAB) must often be transliterated to a lower level of abstraction (e.g., C, FORTRAN). Computational unification provides this software source code transliteration using a priori knowledge of processor elements, state of the art expertise embodied in the computational unifier's analysis, and the semantic structures and parameterized directives in the original source code.

Application source code maintenance (in the software engineering sense) is difficult when a source code base for each type of processor element must be maintained. Computational unification provides for software maintenance in that only one source code base and its unifier directives must be maintained. The computational unification process creates executable code for many types of processor elements from one type of processor element's source code from a priori knowledge of processor elements, state of the art expertise embodied in the computational unifier's analysis, and the semantic structures and parameterized directives in the original source code.

One or two lines of code for one processor element type (dense code) may expand into many lines of code for another processor element type. Computational unification automatically expands the dense one or two lines of code into the many required by a target implicit and/or explicit processor element type. This is part of the normal computational unification process, a priori knowledge of processor elements, state of the art expertise embodied in the computational unifier's analysis and the semantic structures and parameterized directives in the original source code.

Advantageously disclosed herein is a computationally unified system comprising a system interconnect, implicit and/or explicit processor elements and a computational unification method process facilitating the programming of the system. Further disclosed is method for efficient implicit and/or explicit processor software parallelization and resource utilization and estimation. Still further disclosed herein is a method for processor software source code transliteration for implicit and/or explicit processors as well as a method for implicit and/or explicit processor software maintenance and dense software source code expansion. Additionally disclosed herein is the utilization of a computational unification system and method to reduce application software maintenance and to perform application source code transliteration, expansion and parallelization.

Particularly disclosed herein is a method and computer program product for programming a heterogeneous computer system including first and second processors which comprises adding directives to source code of the first processor to produce first processor source code with directives and computationally unifying the first processor source code with directives to produce unified first processor source code and unified second processor source code. The first and second processors may be implicit and explicit devices respectively.

Also particularly disclosed herein is a method and computer program product for computationally unifying a heterogeneous computer system which comprises adding directives to an implicit processor source code; analyzing and abstracting the implicit processor source code with the directives to produce statement templates, source code elements and directive parameters; generating directive based statements from the statement templates, source code elements and directive parameters to produce directive specific code; collecting directive based statements from the directive specific code to produce unified directive specific code; and statement replacing and merging the unified directive specific code and the implicit processor source code with the directives to produce unified implicit processor source code and unified explicit processor source code.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A REPRESENTATIVE EMBODIMENT

SRC Computers LLC, assignee of the present invention, has developed a novel hardware architecture and programming environment that delivers orders of magnitude more performance per processor than otherwise available in current high performance microprocessors. This new architecture is called the IMPLICIT+EXPLICIT™ architecture (trademark of SRC Computers LLC) and comprises a representative embodiment for application of the computational unification system and method of the present invention disclosed herein.

Systems developed with this architecture execute the user's code, written in high-level languages such as C or Fortran, on a mixture of tightly coupled implicitly and explicitly controlled processors. This allows the programmer to utilize both implicitly controlled functions, such as running a standard Linux operating system and executing legacy codes, as well as the explicitly controlled features such as the use of application specific data pre-fetch, data access, and functional units. This architecture is applicable to systems ranging in size from handheld devices to large multi-rack systems.

In order to more readily implement the IMPLICIT+EXPLICIT architecture, SRC Computers developed the Carte™ Programming Environment (trademark of SRC Computers LLC). The tools in the Carte Programming Environment support code development and execution on the hardware, as well as in emulation and simulation environments. These software tools take, for example, high-level language C or Fortran code and compile portions of it to run on the implicitly controlled microprocessors. These tools also create the configuration information needed for the explicitly controlled reconfigurable MAP® processors (trademark of SRC Computers LLC). Everything needed to control both types of processors for a given application, is then combined by the Carte Programming Environment into a single unified executable. This unified executable produced by the Carte tools is distinct from computational unification in that the unified executable contains both executable programs produced by the Carte tools. Computational unification refers to producing one or more executable programs for a heterogeneous system from a single processor's source code.

In this manner, a programmer can easily use standard high-level programming languages and programming models to control a system with both implicitly and explicitly controlled processors and achieve orders of magnitude more computational performance per processor at a significantly lower power consumption and footprint than can be achieved through the use of microprocessors alone.

Figure 1:
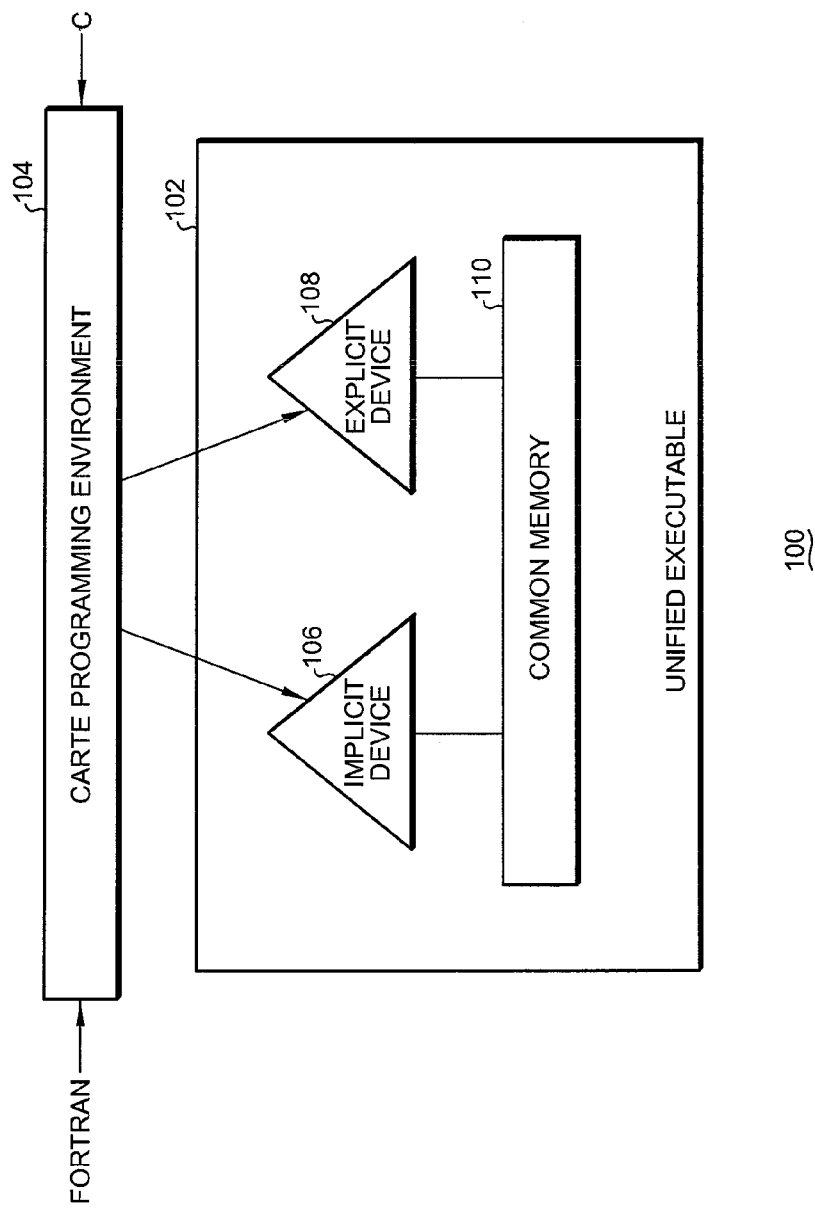
FIG. 1 is a high level block diagram of a representative embodiment of a system for possible implementation of the computational unification system and method of the present invention in the form of an IMPLICIT+EXPLICT™ architecture.

With reference now to FIG. 1, a high level block diagram of a representative embodiment of a system 100 for possible implementation of the computational unification system and method of the present invention is shown in the form of an IMPLICIT+EXPLICT architecture.

The system 100 comprises, in pertinent part, a unified executable 102 produced through the Carte programming environment 104 which allows for application source files being input in, for example, the Fortran or C programming languages. An implicit device 106 and explicit device 108 are programmed through the Carte programming environment, which will be more fully described hereinafter and both are coupled to provide access a common memory 110.

In this architecture, the explicit and implicit processors 106, 108 are peers with respect to their ability to access system memory contents in the form of common memory 110. In this fashion, overhead associated with having both types of processors working together on the same program is minimized. This allows the SRC Carte programming tools to utilize whichever processor type is best for a given portion of the overall application without concern for control handoff penalties.

The implicit devices 106 may also be referred to as Dense Logic Devices (DLDs) and encompass a family of components that includes microprocessors, digital signal processors, Graphics Processor Units (GPUs), as well as some Application Specific Integrated Circuits (ASICs). These processing elements are all implicitly controlled and typically are made up of fixed logic that is not altered by the user. These devices execute software-directed instructions on a step-by-step basis in fixed logic having predetermined interconnections and functionality.

On the other hand, the explicit devices 108 may also be referred to as Direct Execution Logic (DEL) and comprise a family of components that is explicitly controlled and is typically reconfigurable. This includes Field Programmable Gate Arrays (FPGAs), Field Programmable Object Arrays (FP-GAs) and Complex Programmable Logic Devices (CPLDs). This set of elements enables a program to establish an optimized interconnection among the selected functional units in order to implement a desired computational, pre-fetch and/or data access, functionality for maximizing the parallelism inherent in the particular code.

Both the implicit device 106 (DLD) and explicit device 108 (DEL) processing elements are interconnected as peers to a shared system memory (e.g. common memory 110) in one fashion or another and it is not required that interconnects support cache coherency since data sharing can be implemented in an explicit fashion.

The DEL computing of the explicit device 108 uses dynamic logic, which conforms to the application rather than forcing the application into a fixed microprocessor architecture where one size must fit all. This delivers the most efficient circuitry for any particular code in terms of the precision of the functional units and the parallelism that can be found in the code. The result is a dynamic application specific processor that can evolve along with a given code and/or can be reprogrammed in a fraction of a second to handle different codes. DEL computing provides users the performance of a special purpose computer and the economy of a general-purpose machine.

SRC Computers' current general-purpose computer systems comprise MAPstation™ workstations (trademark of SRC Computers LLC), high performance rack-based systems, and airborne systems all as part of the SRC-7 product line. All systems use the same implicitly and explicitly controlled system components, as well as the same SRC Carte Programming Environment, allowing for complete portability of applications between systems.

The Carte Programming Environment makes this integration possible by enabling the programmer to utilize ANSI standard Fortran or C high-level languages to specify their application on both the implicit and explicit devices. The output from compilation in the Carte Programming Environment is a single, unified executable for the target SRC heterogeneous computer system. Note that the explicit devices may have their own programming idiom in that while using an ANSI standard computer language, the explicit devices utilize expressions within that language distinct from the expressions utilized in the implicit device program.

In some currently available heterogeneous computer systems, a low bandwidth and high latency input/output bus separates the FPGA device from the CPU. The SRC IMPLICIT+EXPLICIT Architecture removes this limitation by enabling the CPU and MAP processors to operate as peers on system memory. This means only system memory bandwidth and latency limits these devices, which greatly improves overall application performance on a SRC system. The unified programming environment using standard languages and the implicit and explicit devices limited only by system memory characteristics of the IMPLICIT+EXPLICIT Architecture, provide the user with an easy-to-use high-performance application platform unmatched by any workstation or compute cluster node available today.

The IMPLICIT+EXPLICIT Architecture allows users to execute existing code, or easily recompile and develop new codes to take advantage of the power of the reconfigurable MAP processors in the system. This hardware and software architecture fully integrates microprocessor technology and reconfigurable MAP processors to deliver orders of magnitude increases in performance and reductions in power consumption. The SRC Carte Programming Environment eliminated the historic problems that programmers faced in getting microprocessor portions of code to work with reconfigurable processor portions.

The IMPLICIT+EXPLICIT Architecture is available in systems ranging from a single MAPstation workstation or embedded system to clusters to Hi-Bar switch-based configurations as will be more fully described hereinafter. All of these configurations use the same basic hardware and software building blocks resulting in complete code interoperability.

Figure 2:
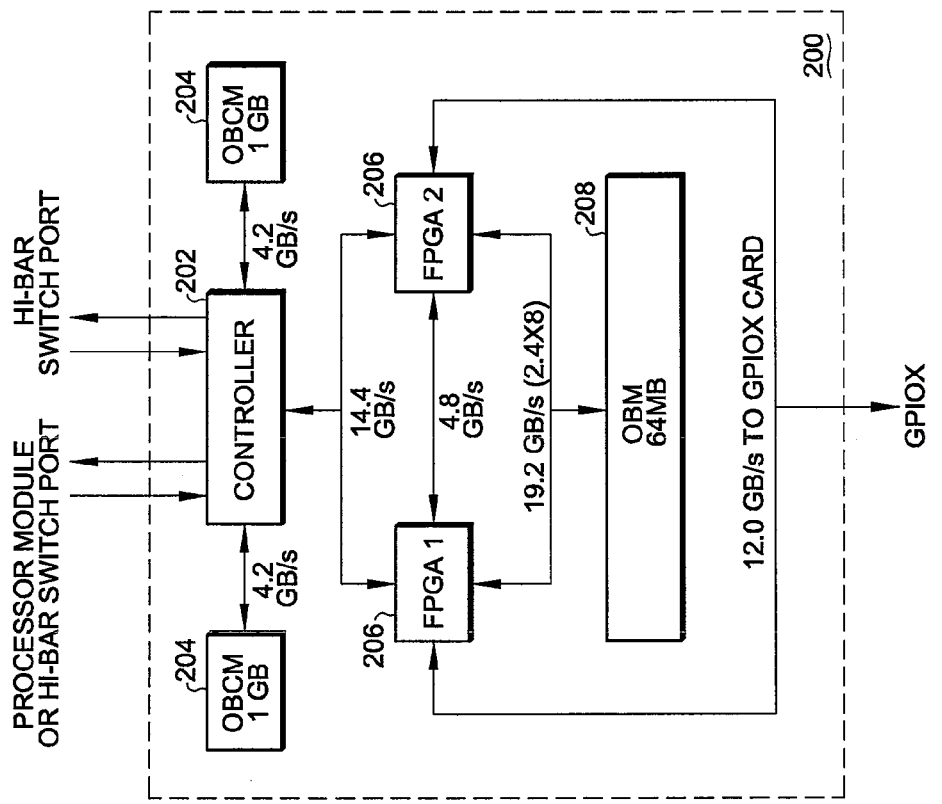
FIG. 2 is a functional block diagram of a MAP® processor comprising reconfigurable direct execution logic for use as an explicit device in the preceding figure utilizing field programmable gate arrays.

With reference additionally now to FIG. 2, a functional block diagram of a MAP processor 200 comprising reconfigurable direct execution logic is shown for use as an explicit device in the preceding figure utilizing field programmable gate arrays.

The MAP processor 200 comprises, in pertinent part a controller 202 for bidirectionally coupling the MAP processor 200 to another processor module or Hi-Bar switch port. A pair of high speed, onboard common memory arrays (OBCM), for example static random access memory (SRAM) of 1 GB each, are bidirectionally coupled to the controller 202 by respective buses having an available bandwidth of 4.2 GB/sec. A pair of FPGAs 206 (FPGA1 and FPGA2) are coupled to the controller through a bidirectional bus having a bandwidth of 14.4 GB/sec as well as to each other by a bus having a bandwidth of 4.8 GB/sec. The FPGAs 206 are also bidirectionally coupled to an onboard memory array (OBM) 208 of about 64 MB by a bus having a bandwidth of 19.2 GB/sec as well as to a general purpose I/O (GPIOX) port through a bidirectional bus having a bandwidth of 12.0 GB/sec.

The MAP processor 200 comprises a high performance DEL processor. The MAP processor 200 uses reconfigurable components in the form of FPGAs 206 to accomplish both control and user-defined compute, data pre-fetch, and data access functions. This compute capability is teamed with very high on and off-board interconnect bandwidth. The MAP processor 200 utilizes multiple banks of SRAM on-board memory 204 provide 19,200 MBs/sec. of local memory bandwidth. The MAP processor 200 is further provided with two separate sets of input and output ports with each port sustaining a data payload bandwidth of 3600 MB/sec. The MAP processor 200 also has two banks of SDRAM globally shared common memory that are accessible by any processor in the system. Each MAP processor 200 also has a GPIOX port sustaining an additional data payload of up to 12.0 GB/sec. for direct MAP processor 200 to MAP processor 200 connections or sensor data input.

The explicit devices are contained within the MAP processor 200. These devices may, for example, comprise two 150 MHz Altera Stratix™ II EP2S180 FPGAs 206 with direct access to each other, 64 MB On-Board Memory (OBM) 208, the GPIOX port, and the interface controller 202. The interface controller 202 provides access to other processor modules and to the 2 GB of On-Board Common Memory (OBCM) 204. The aggregate sustained payload bandwidth between the MAP processor 200 and other processor modules is 14.4 GB/sec., or 7.2 GB/sec. per port pair.

The SDRAM OBM 208 provides 16 independent 64-bit memory references to the FPGAs 206 every clock cycle. This allows a maximum bandwidth between the OBM 208 and an FPGA 206 of 19.2 GB/sec. The data for the explicit portion of an application are allocated in the OBM 208 by the programmer, and the actual achievable bandwidth between the OBM 208 and the FPGAs 206 may be determined by the application requirements.

The two banks of OBCM 204 provided enable the programmer to specify a third level of data locality for their application. The second level of data locality is the OBM 208 and the first is the FPGA 206 internal memory. Typically, large application data sets are stored here and appropriate data subsets are moved to OBM 208 (or directly to the logic) for processing. These OBCM 204 banks are part of the globally shared memory space in a MAP processor 200 based computer system.

The GPIOX port provides direct access up to 12.0 GB/sec. to external devices (e.g. cameras, analog to digital converters, sensors, etc.) or allows chaining of other multiple MAP processors 200. The GPIOX interface is an open standard and is described in the GPIOX Hardware Specification document SWP-011-00.

Figure 3:
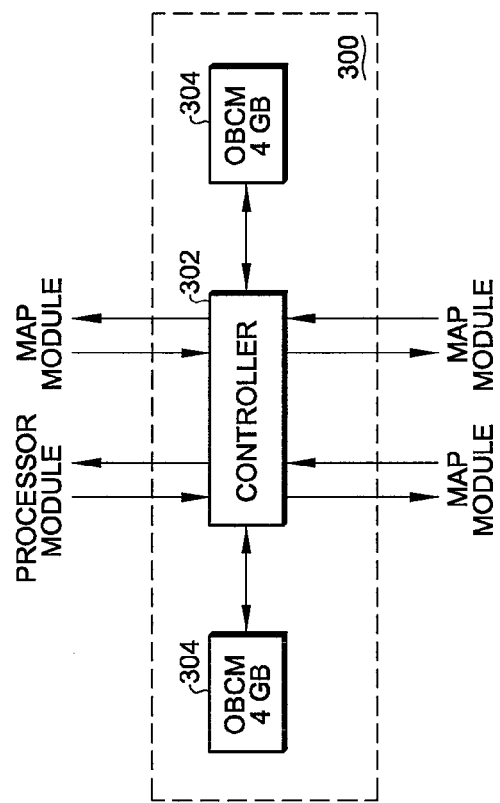
FIG. 3 is a functional block diagram of a multi-ported common memory providing support for a dense logic device such as a commodity microprocessor and up to three MAP processors.

With reference additionally now to FIG. 3, a functional block diagram of a multi-ported common memory 300 is shown for providing support for a dense logic device such as a commodity microprocessor and up to three MAP processors 200 (FIG. 2). The multi-ported common memory (MPCM) 300 comprises, in pertinent part, a controller 302 which provides bidirectional coupling to a processor module and up to three MAP modules. The multi-ported common memory 300, in the representative embodiment illustrated, also comprises a pair of 4 GB OBCM memory arrays.

Each MPCM 300 assembly for SRC-7 MAPstation systems has four output and four input ports. These ports allow the programmer to access two 16 GB Common Memory banks. The ports support one microprocessor module and up to three MAP processors. The intelligent DMA controller 302 on the MPCM 300 module is capable of performing complex DMA pre-fetch and data access functions such as data packing, strided access and scatter/gather, to maximize the efficient use of the system interconnect bandwidth. Interconnect efficiencies more than 10 times greater than a cache-based microprocessor using the same interconnect are common for these operations. Each input or output port sustains a yielded data payload of at least 3.6 GB/sec. with Single Error Correction and Double Error Detection (SECDED) implemented on each port.

Figure 4:
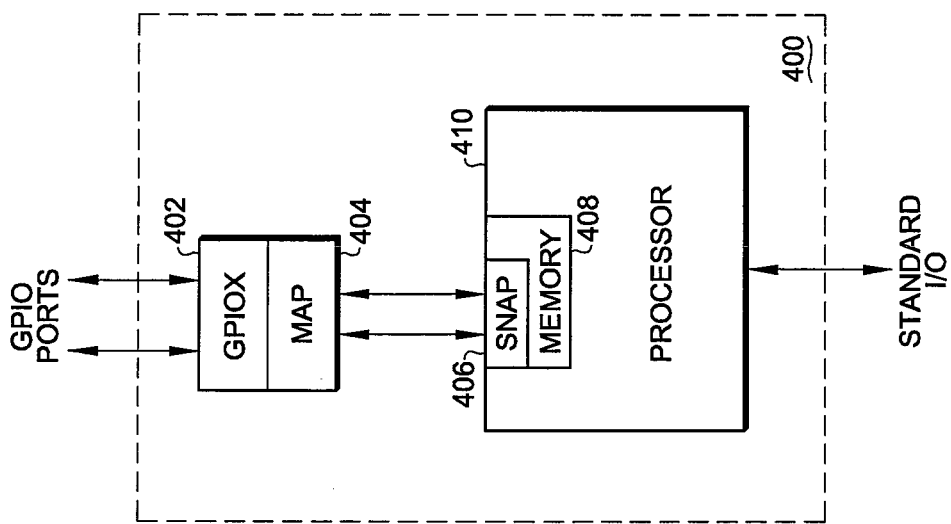
FIG. 4 is a functional block diagram of a single MAP processor MAPstation™.

With reference additionally now to FIG. 4, a functional block diagram of a single MAP processor MAPstation 400 is shown. The MAPstation 400 illustrated comprises a GPIOX port 402 coupled to a MAP processor 404 as previously described with respect to FIG. 2. The MAP processor 404 is bidirectionally coupled to a SNAP™ port 406 (trademark of SRC Computers LLC) which is directly coupled in the memory space 408 of a processor 410.

This configuration of the SRC-7 MAPstation system contains one microprocessor module 410 and one MAP processor 404 with a direct interconnect. Since this system does not contain an MPCM module 300 (FIG. 3), only one MAP module may be installed.

The implicit DLD used in MAPstations is typically one of several commodity microprocessors. These third party commodity boards are then equipped with a SNAP 406 interface.

The SNAP interface 406 allows commodity microprocessor boards to connect to, and share memory with, the MAP processors 404 and common memory nodes that make up the rest of the SRC system. A SNAP 406 module may be plugged directly into the DIMM connectors on the microprocessor motherboard and functions directly in the microprocessor 410 memory subsystem 408, instead of its I/O subsystem, allowing the system to sustain significantly higher interconnect bandwidths and lower latencies than I/O based connections. The SNAP 406 interface uses separate input and output paths with each path currently sustaining a data payload bandwidth of 3.6 GB/sec.

By using a SNAP 406 module to connect to the microprocessor 410 memory subsystem 408 instead of its I/O subsystem, such systems can sustain significantly higher interconnect bandwidths. The SNAP 406 module uses separate input and output ports with each port sustaining data payload bandwidth on the order of 3.6 GB/sec. and as high as 7.2 GB/sec. The SNAP 406 interface can either connect directly to a single MAP processor or to a Hi-Bar® switch (trademark of SRC Computers LLC) for system-wide access to multiple MAP processors, other microprocessors or Common Memory.

Figure 5:
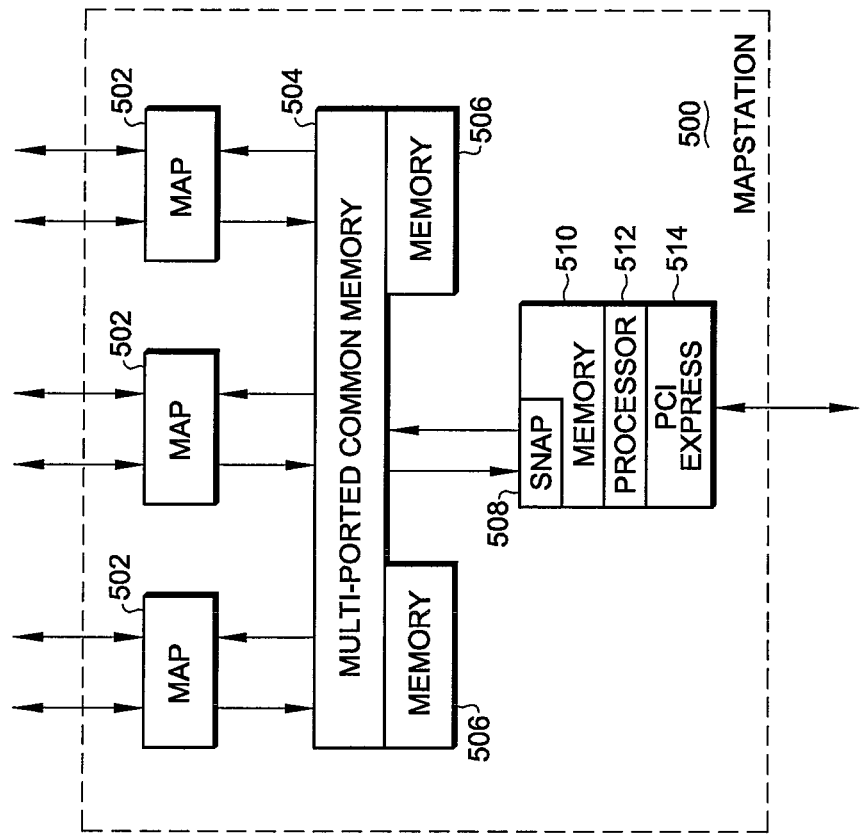
FIG. 5 is a functional block diagram of a MAPstation system comprising three of the MAP processors of FIG. 2 interconnected via a multi-ported common memory module.

With reference additionally now to FIG. 5, a functional block diagram of a MAPstation system 500 is shown comprising three of the MAP processors of FIG. 2 interconnected via a multi-ported common memory module. The MAPstation system 500 comprises up to three MAP processors 502 coupled to a multi-ported common memory (MPCM) 504 as per FIG. 3. The MPCM 504 comprises a controller and associated memory arrays 506 as shown. The processor port of the MPCM 504 is coupled to a SNAP 508 interface coupled to the memory 510 subsystem of a processor 512 having, for example, a PCI Express bus interface 514. If a MAPstation system 500 is configured with an MPCM module, then its configuration may have up to three Series H MAP processors 502 in addition to the microprocessor module. The two OBCM banks comprising memory 506 can be populated with up to 16 GB of SDRAM each.

Figure 6:
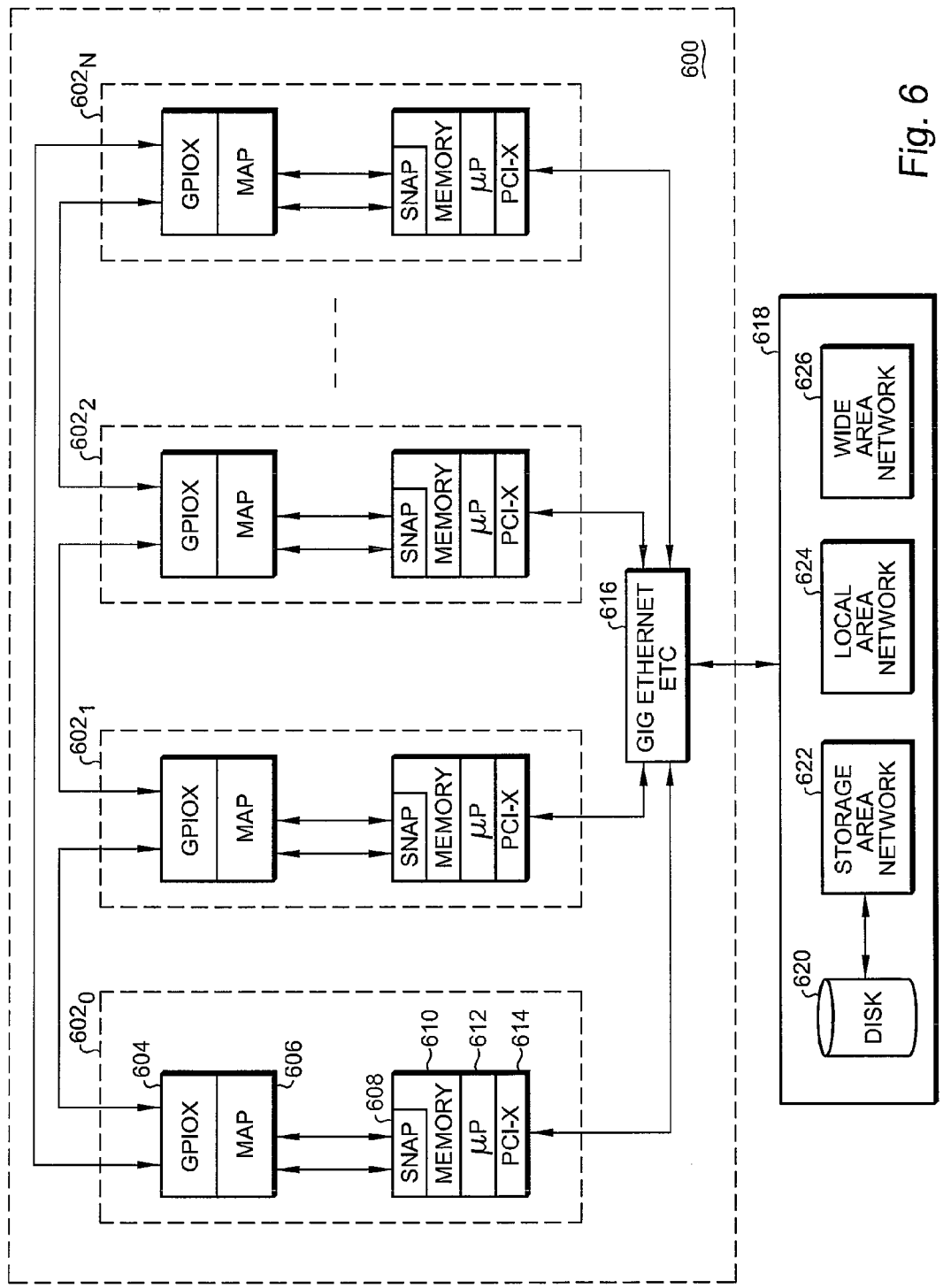
FIG. 6 is a functional block diagram of a cluster system implemented with a microprocessor and the MAP processor of the preceding figures in a direct coupled configuration.

With reference additionally now to FIG. 6, a functional block diagram of a cluster system 600 implemented with a microprocessor and the MAP processor of the preceding figures is shown in a direct coupled configuration. The cluster system 600 illustrated comprises a number of MAPstations $602_0$, $602_1$, $602_2$ through $602_n$, each comprising a GPIOX port 604, MAP processor 606, SNAP 608, microprocessor 612 with associated memory space 610 and a PCI Express (PCI-X) port 614. As illustrated the GPIOX ports 604 of the MAP processors 604 are chained together and the PCI-X ports 614 are coupled to a gigabit Ethernet port 616 to access a network 618 which may comprise a storage area network (SAN) 622 with associated data storage 620, a local area network (LAN) 624 and/or a wide area network (WAN) 626.

System level configurations implement either a cluster of MAPstation workstations, or a crossbar switch-based topology. Cluster based systems, as shown in FIG. 6, utilize the microprocessor and MAP processor previously discussed in a direct connected configuration. While this topology does have a microprocessor/MAP processor affinity, it also has the benefit of using standards-based clustering technology to create very large systems.

Figure 7:
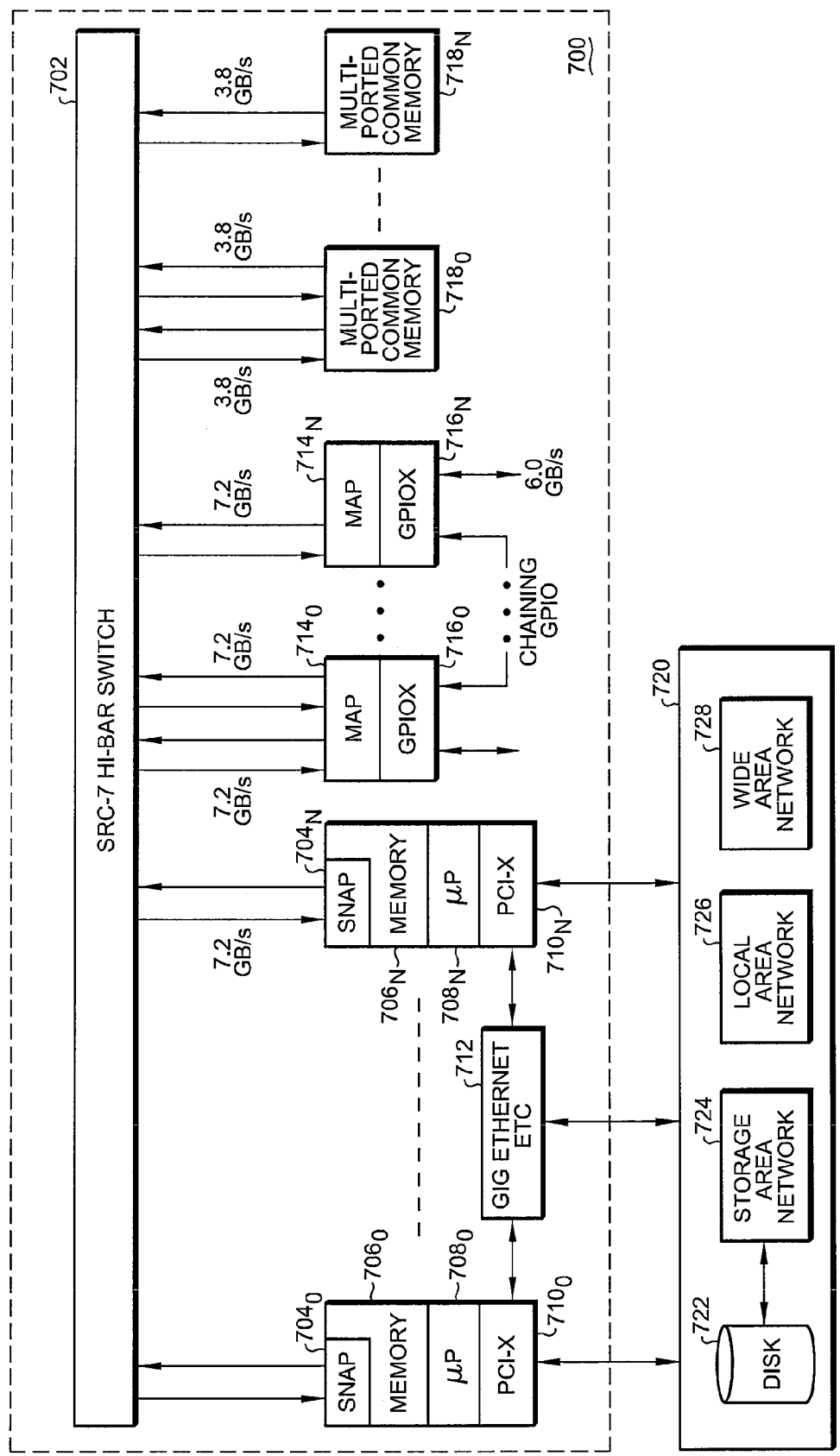
FIG. 7 is a functional block diagram of a computer system for possible implementation of an embodiment of the present invention utilizing a Computers LLC proprietary Hi-Bar® switch with up to 16 I/O ports coupled to 16 nodes comprising microprocessors, MAP processors and/or common memory devices.

With reference additionally now to FIG. 7, a functional block diagram of a computer system 700 for possible implementation of an embodiment of the present invention is shown utilizing an SRC Computers LLC proprietary Hi-Bar switch with up to 16 I/O ports coupled to 16 nodes comprising microprocessors, MAP processors and/or common memory devices. The computer system 700 comprises a Hi-Bar switch 702 and a number of processor units, each comprising a processor 708 having a SNAP 704 coupled to the processor memory space 706 and an associated PCI-X port 710 coupled to a gigabit Ethernet port 712 as shown.

The computer system 700 further comprises a number of MAP processors $714_0$ through $714_n$, each coupled to the Hi-Bar switch 702 and having their associated GPIOX ports 716 chained together as illustrated. A number of multi-ported common memory (MPCM) units $718_0$ through $718_n$ are also coupled to the Hi-Bar switch 702 and accessible by the processor units 704 and the MAP processors 714 as previously described. The gigabit Ethernet port 712 couples the computer system 700 to a network 720 which may comprise a SAN 724 with associated data storage 722, a LAN 726 and/or a WAN 728.

The Hi-Bar switch-based computer system 700 offers somewhat more flexibility than the cluster system 600 of FIG. 6. The Hi-Bar switch 702 is SRC Computers' proprietary scalable, high-bandwidth, low-latency switch. Each Hi-Bar switch module supports 64-bit addressing and has 16 input and 16 output ports to connect to 16 nodes. Microprocessor units, MAP processors 714, and MPCM memory 718 nodes can all be connected to the Hi-Bar switch 702 in any configuration as shown. Each input or output port sustains a yielded data payload of 3.6 GBs/sec. for an aggregate yielded bisection data bandwidth of 57.6 GB/sec per 16 ports. Port-to-port latency is 180 ns with Single Error Correction and Double Error Detection (SECDED) implemented on each port. Hi-Bar switches 702 can also be interconnected in multi-tier configurations, allowing two tiers to support 256 nodes.

Each of these Multi-Ported Common Memory nodes 718 comprises an intelligent DMA controller and, for example, up to 64 GBs of DDR-2 SDRAM. This memory supports 64-bit addressing and can be accessed by all other MAP 714 and microprocessor nodes in the system using any one of the four ports located on the memory module. Any port sustains memory reads and writes with 3.6 GB/sec of yielded data payload bandwidth.

Figure 8:
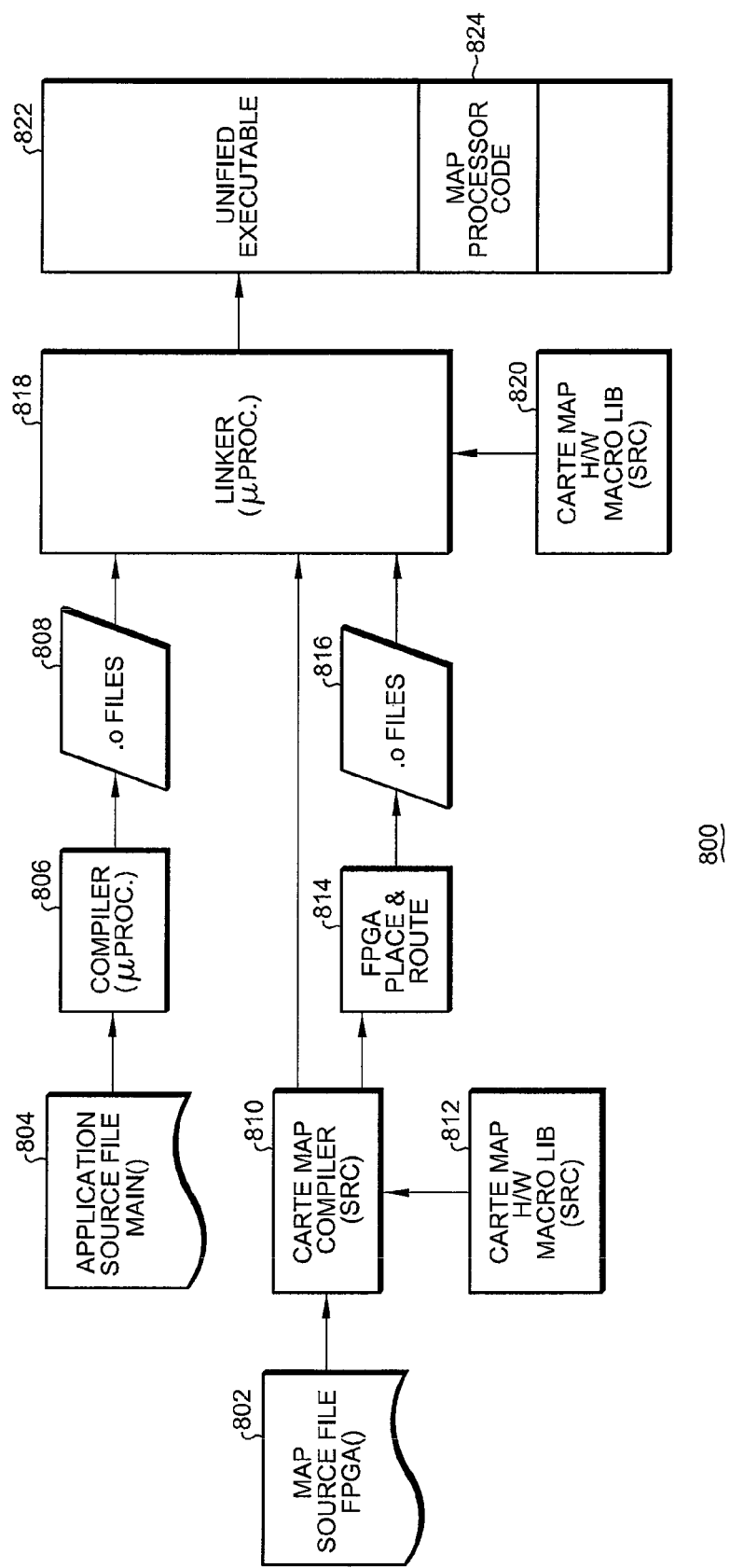
FIG. 8 is a representative code development process for generating a single unified executable targeting a dense logic device such as a commodity microprocessor and direct execution logic in the form of a MAP processor.

With reference additionally now to FIG. 8, a representative code development process 800 is shown for generating a single unified executable targeting a dense logic device such as a commodity microprocessor and direct execution logic in the form of a MAP processor. The process 800 begins with the input of the MAP source files 802 and application source files 804, the latter being compiled by the microprocessor compiler at step 806 to produce object files 808 in a conventional manner.

In this case, the Carte MAP compiler 810 receives the MAP source files 802 and uses the hardware version of the Carte macro libraries 812 and invokes the FPGA place and route tools 814 in order to generate an FPGA bit stream. This bitstream is included in the object file output 816 by the Carte MAP compiler. All object files 808 and 816 are linked at step 818 with the hardware macro library symbols 820 being resolved, using the Carte libraries. In this way, the FPGA programming bitstream and the runtime code 824 is embedded within the single unified application executable 822. It is also possible for programmers to incorporate their own Verilog or VHDL IP into these libraries. This allows them to instantiate the IP by using a simple function call.

SRC software is comprised of two major elements: standard third party software and the SRC Carte Programming Environment. The SRC-7 MAPstation system utilizes standards-based software with a Linux Fedora operating system forming the base systems software. Compilers, debuggers and software management tools supported within Linux can be used on SRC Computer systems and interfaced with the Carte Programming Environment. Some of the tools may include the Intel® Fortran Compiler; the Intel® C++ Compiler and/or the Altera Quartus® II FPGA design software. The Linux operating system (OS) environment also allows access to a multitude of drivers and libraries that support peripheral storage and networking.

The Carte Programming Environment takes applications written in standard ANSI Fortran and/or C and seamlessly integrates the computational capability of the MAP processor and microprocessors into a single unified executable. More specifically, the Carte Programming Environment allows the programmer to explicitly define concurrent execution of code within a microprocessor/FPGA heterogeneous system while providing explicit data management within the memory hierarchy. The programmer is given the ultimate access to low-level hardware capabilities: definition and creation of processor hardware from within high-level programming languages. This level of control over compute and memory access greatly facilitates achieving high computational performance.

Although the Carte Programming Environment is comprised of several components, the major software component is the SRC MAP compiler, which is currently available as a MAP/Fortran compiler or a MAP/C compiler. The MAP compiler creates the direct execution logic for the MAP FPGAs. The compilation system extracts maximum parallelism from the code and generates pipelined hardware logic instantiated in the FPGAs. The compiler generates all the required interface code to manage the movement of data to and from the MAP processor, and to coordinate microprocessor execution with the logic running in the MAP processor. The libraries fully support integer, single and double precision floating point data types.

All of the required interface and management code is contained in the Carte runtime libraries. The SNAP™ driver and the associated libraries are provided with the Carte Programming Environment, allowing the application developer to easily design and implement their algorithms in a fully integrated manner. The Carte Programming Environment also provides users with the ability to emulate and simulate compiled code in "debug mode". Debug mode compilation allows the user to compile and test all of their code on the CPU without invoking the FPGA place and route tools. Loop performance information is also provided in debug mode, which enables accurate MAP processor code performance estimation before FPGA place and route.

Figure 9:
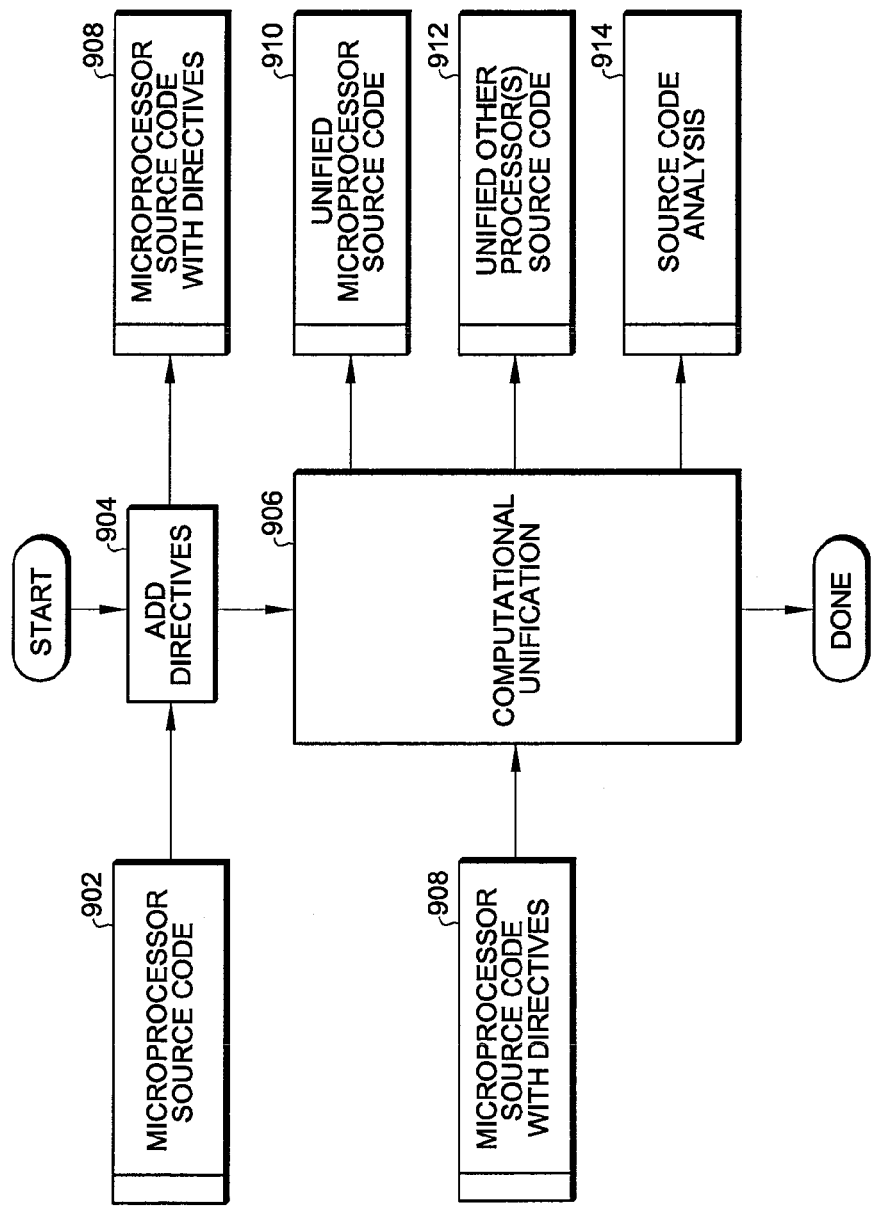
FIG. 9 is an overview of the computational unification process flow of the present invention at a user level.

With reference additionally now to FIG. 9; an overview of representative embodiment of the computational unification process flow of the present invention at a user level is shown. From the user's point of view, the computational unification process 900 starts with microprocessor source code at data store step 902. Performance and dataflow analysis of this program indicates which functions need to execute on the microprocessor and which functions will benefit from executing on the other types of processors in a heterogeneous system. The user adds parameterized directives at process step 904 to the original source code to guide the computational unification process 906.

Since the microprocessor compiler ignores the directives, the original source code is effectively unchanged from the use-case of compilation for a homogeneous microprocessor system. This enables the software maintenance aspects of computational unification, as one microprocessor code base may be compiled for any number of different types of heterogeneous processors as well as a microprocessor-only system.

Computational unification process 906 takes this microprocessor source code with user-inserted directives at data store step 908 and generates unified microprocessor source code at data store step 910 and unified source code for other processor types in a system at data store step 912. A source code analysis is also generated at data store step 914 with resource utilization, programming hints, suggestions and information for the programmer for further execution improvement. The unified microprocessor source code 910 becomes the application source file 804 (FIG. 8) and the unified other processor source code 912 becomes the MAP source file 802. In the way, the computational unification process and method may be considered an enhancement to the source code input to the Carte tools.

The generated unified source code may be quite different from portions of the original microprocessor source code. Different processor types may require a different programming idiom appropriate to a given processor architecture, even if all original and generated source code is in an ANSI standard language. In other cases (e.g., GPU as the other processor), the target language syntax, support libraries and extensions are all specific to the other processor is not a standard computer language. The programming methodology and idiom for a given processor target is embodied in the computational unification process implementation.

Often, efficient program execution in a heterogeneous system requires the programmer to parallelize original microprocessor source code. Computational unification eases this task by embodying parallelization knowledge into the unification process. This includes automatic analysis of the source code and generating appropriate parallel program idiom for a processor type.

Computer system resources are not infinite, and a programmer is often at a loss to estimate resource utilization when faced with a new type of heterogeneous processor architecture. In the course of the computational unification process, the processor domain specific knowledge embodied in the unification process is used to estimate system resource utilization and provide the programmer with resource utilization and information to increase the resource utilization efficiency for their microprocessor source code and the target system. Here, resources refer to many aspects of a heterogeneous system: memory size and allocation, data movement paths, FPGA resources, number of GPU or microprocessor cores, and so on. Resources could also refer to system considerations such as size, weight and power requirements.

Often programmatic structures may be expressed in an efficient form (e.g., three or four lines of code) for one processor type. In order to achieve a similar result on a different processor, sometimes these three or four lines of code may need to be expanded into many lines of code for efficient execution. This code expansion obfuscates a program's function and reduces quality from a software maintenance point of view. The unification process removes this problem by making the code expansion for a different processor type invisible to the user.

Sometimes software source code must be transliterated between two forms in order to meet updated standards. The computational unification process embodies the transliteration functions as part of its usual process flow.

Figure 10:
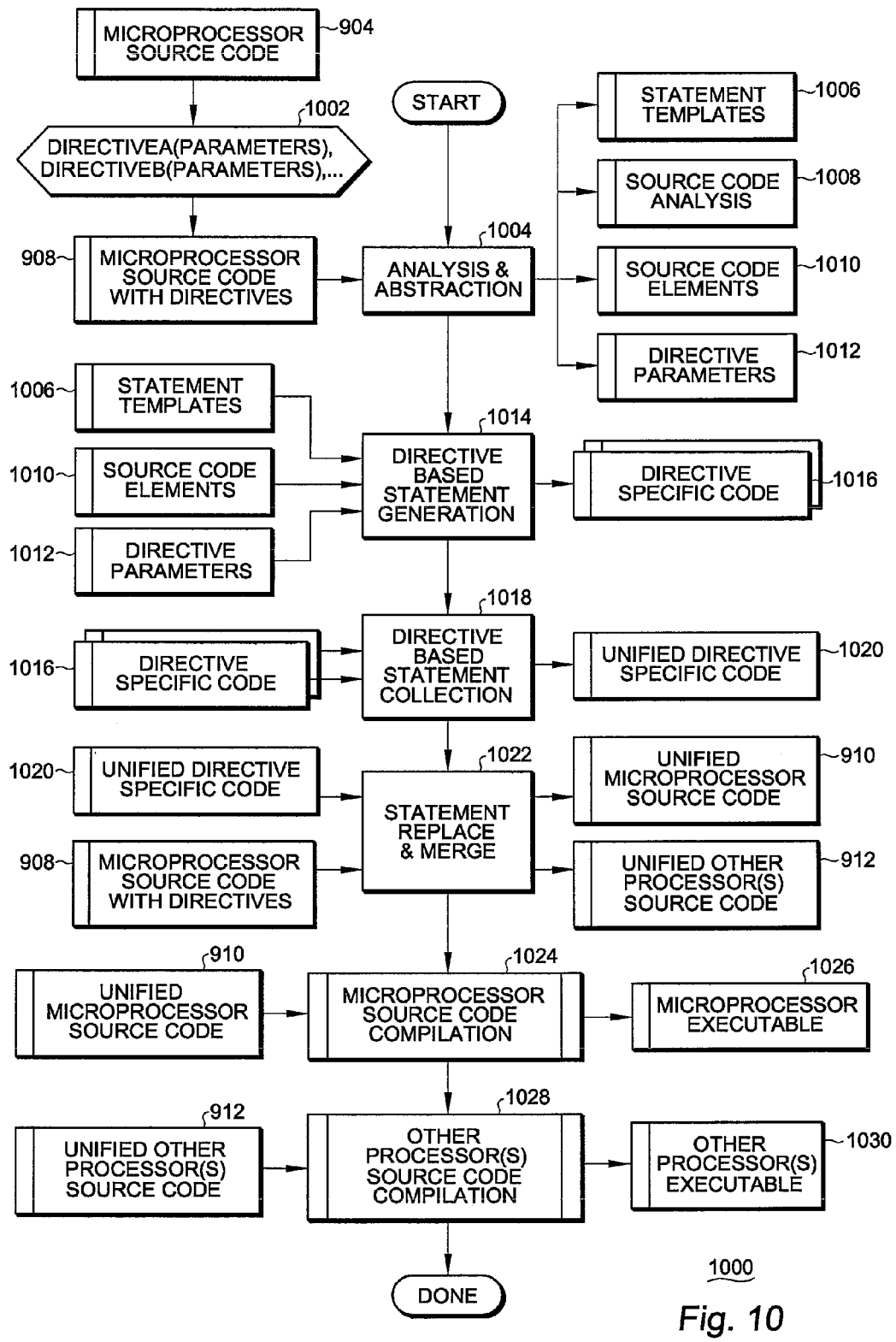
FIG. 10 is an overview of the computational unification process flow.

With reference additionally now to FIG. 10, an overview of the representative embodiment of the computational unification process flow of the present invention is shown. The process 1000 analyses the original microprocessor source code 904 with programmer-inserted directives at step 1002 to produce microprocessor source code with directives at data store step 908. Through a process of analysis and abstraction at step 1004, statement templates, source code analysis, source code elements and directive parameters are produced at data store steps 1006, 1008, 1010 and 1012 respectively.

The analysis and abstraction process 1004 generates language-specific code statement templates, results of the source code analysis, parameters extracted from the source code directives and various source code elements (e.g., subroutine variable lists, program variable types, parsed code structures, and so on) used internally later in the unification process as will be more fully described hereinafter.

The statement templates 1006, source code elements 1010 and directive parameters 1012 are then input to a directive based statement generation process 1014 to produce directive specific code at data store 1016.

In the directive-based statement generation process 1014, each directive specifies generation of a set of variables and code statements to perform a certain function. This may be (but is not limited to) data movement instructions, code parallelization, transforming arrays to/from scalars, memory allocation and whatever else is required to correctly and efficiently implement a directive's function and associated source code for a given processor architecture. At the end of this step, several sets of variables and code statements exist as separate objects in the unifier. The next step, directive-based statement collection process 1018, gathers the generated variables and code statements and arranges them in their proper order relative to each other. The end result of this step is a single partial unified source code object indicated by data store step 1020.

The statement replace and merge step 1022 combines the unified directive-based generated code from step 1020 with required code statements from the original source code at step 908. A portion of the original source code will not need to be translated by the unification process and is integrated with the process' generated code in this step. Any required boilerplate code to ensure successful compilation is also included in this step. Boilerplate code here means any code statements that are included in many or all programs with little or no alteration. The result of this step is some number of complete, integrated source code files, some for the microprocessor target, indicated as the unified microprocessor source code at step 910 and some for the other processor targets in the heterogeneous system, indicated as the unified other processor(s) source code at step 912. Each unified source code file may then be compiled for execution in the usual manner for the given processor type. As shown, the unified microprocessor source code at data store step 910 is compiled by predefined process 1024 to produce the microprocessor executable at step 1026 and the unified other processor(s) source code is compiled at predefined process step 1028 to produce the other processor(s) executable at step 1030.

Figure 11:
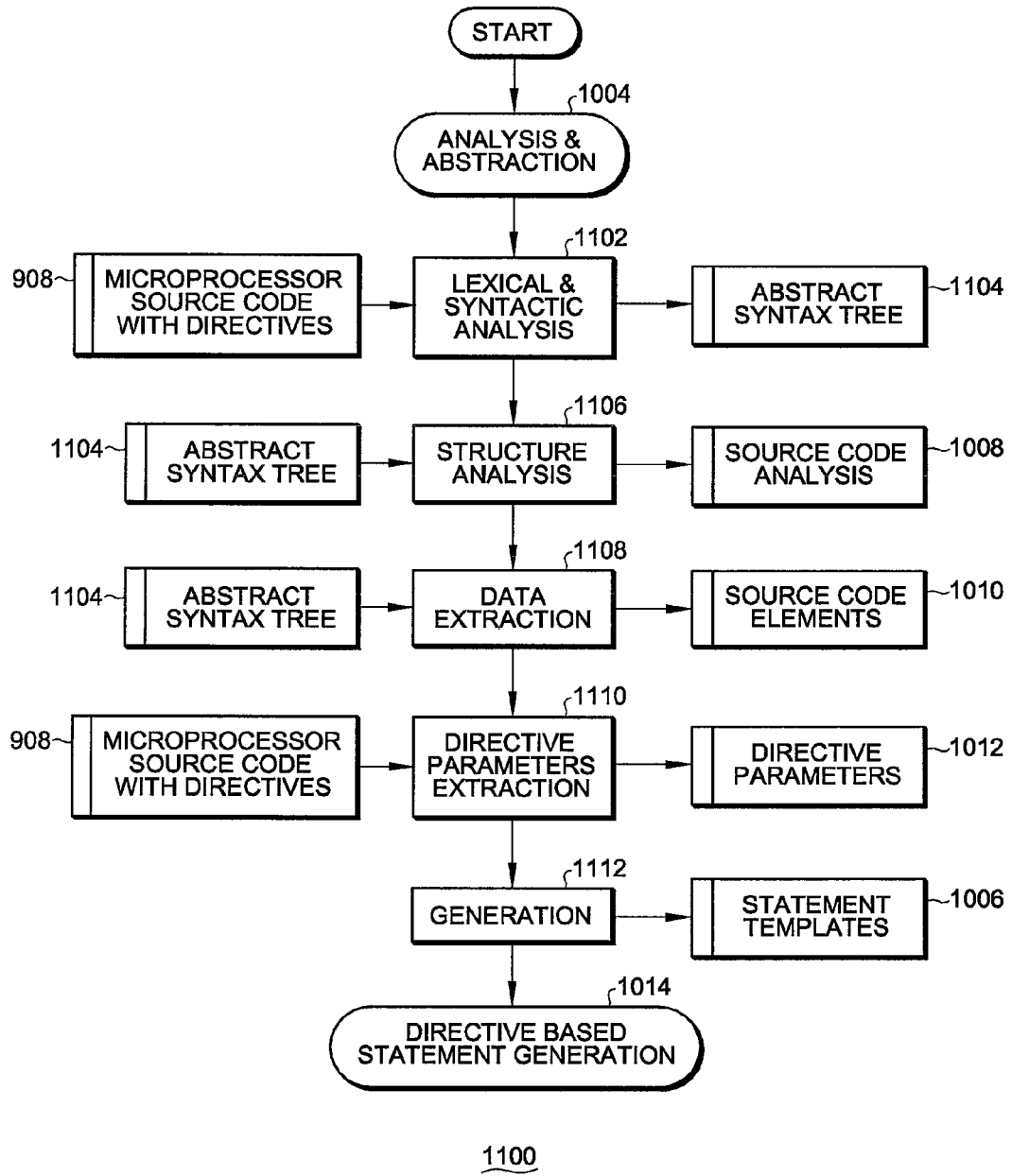
FIG. 11 is a process flow of the analysis and abstraction process of the overall computational unification process flow.

With reference additionally now to FIG. 11, a process flow 1100 of the analysis and abstraction process 1004 of the representative embodiment of the overall computational unification process is shown.

The microprocessor source code with directives 908 is analyzed (parsed) at lexical and syntactic analysis step 1102 into an Abstract Syntax Tree (AST) 1104 using a language-specified parser (e.g., C, FORTRAN, Python, MATALB, and the like) The AST 1104 provides the information structure for the source code structure analysis at process step 1106 to provide source code analysis at data store step 1008 for resource estimation. The AST 1104 also provides the information structure for the data extraction step 1108 to provide source code elements 1010. The unifier directives and defined directive parameters are then collected as shown by directive parameter extraction process 110 to provide directive parameters 102. The language-specific code statement templates are also generated as shown by generation process 1112 to provide statement templates 1006. These will be used later in the unification process to create variable declarations and code statements for the unified source code files in the directive based statement generation process 1014.

Figure 12:
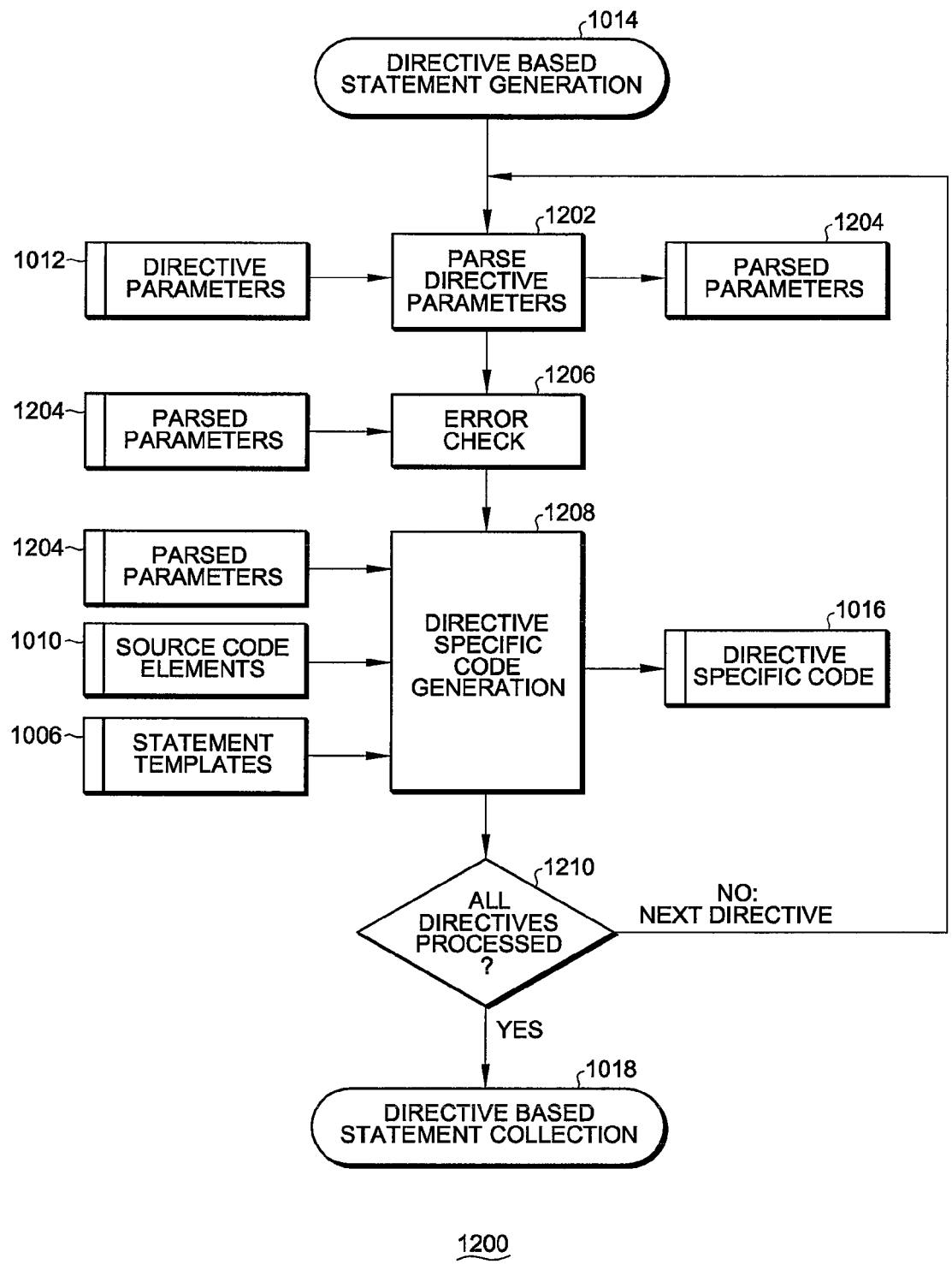
FIG. 12 is a process flow of the directive based statement generation process of the overall computational unification process flow.

With reference additionally now to FIG. 12, a process flow 1200 of the directive based statement generation process 1014 of the overall computational unification process is shown. The process 1014 is performed for each individual unifier directive found in the microprocessor source code. The directive parameters at data store step 1012 are parsed at step 1202 and stored at data store step 1204 for later use. These parameters are checked for specific errors at process step 1206. Given the parsed directive parameters 1204, the source code elements 1010 extracted in the previous analysis and abstraction step 1004 and the code statement templates 1006 also generated in the previous step, the unification process creates variable declaration and code statements appropriate for this directive. This is indicated by the process step 1208 to produce the directive specific code 1016. At decision step 1210, if all directives have not been processed the process 1200 returns to step 1202. Otherwise, the process 1200 proceeds to the directive based statement collection process 1018. Process 1200 is the step in the overall unification process that embodies domain expertise and knowledge of efficient code generation for a given processor type. This step produces variable declarations and code statements for each individual unifier directive and its defined parameters.

Figure 13:
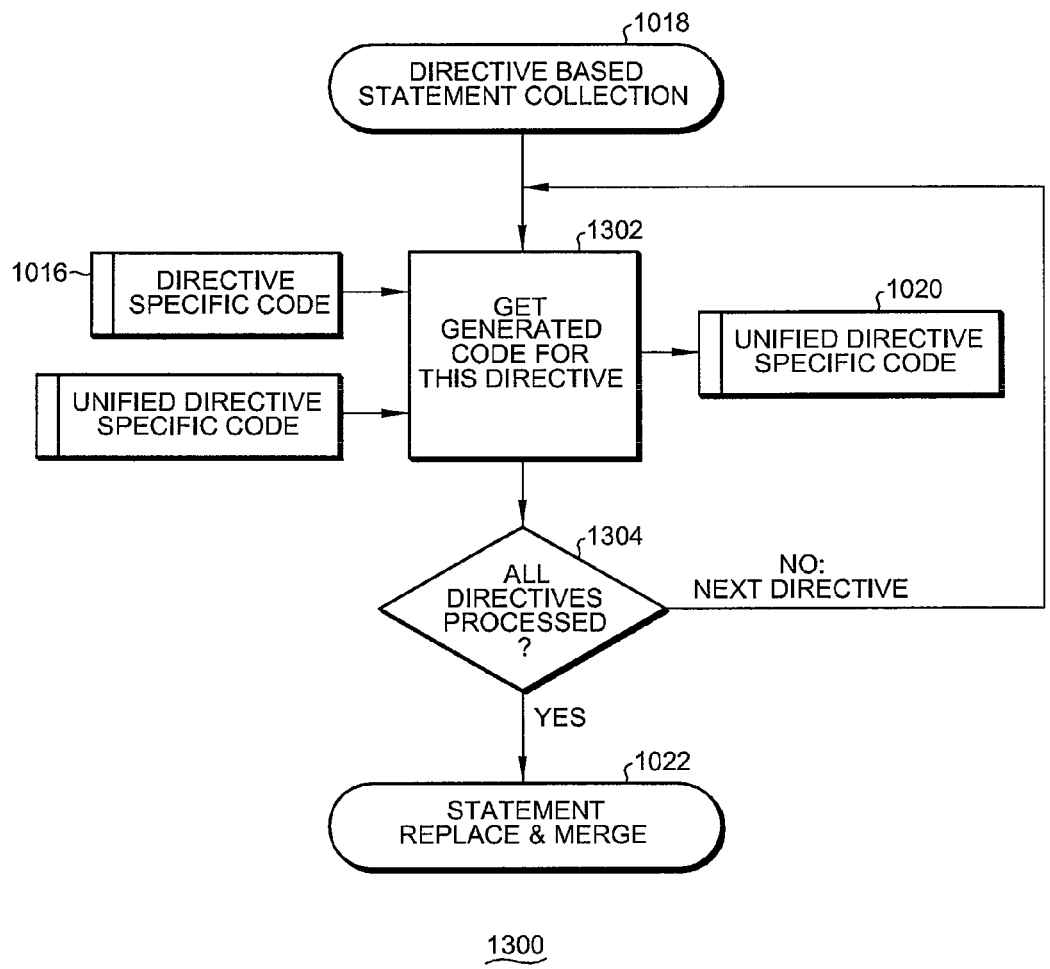
FIG. 13 is a process flow of the directive based statement collection process of the overall computational unification process flow.

With reference additionally now to FIG. 13, a process flow 1300 of the directive based statement collection process 1018 of the overall computational unification process is shown. The directive specific code 1016 and unified directive specific code are operated upon at process step 1302 to generate unified directive specific code 1020. If all directives have not been processed at decision step 1304, the process 1300 returns to step 1302. Otherwise, the process 1300 proceeds to the statement replace and merge step 1022.

Compiling and executing code statements in the proper order is critical. The process 1300 begins the in-order assembling of code statements for each of the generated directive specific code sets. The result is one file object with marked gaps awaiting the insertion of required unmodified source code from the microprocessor source code file.

Figure 14:
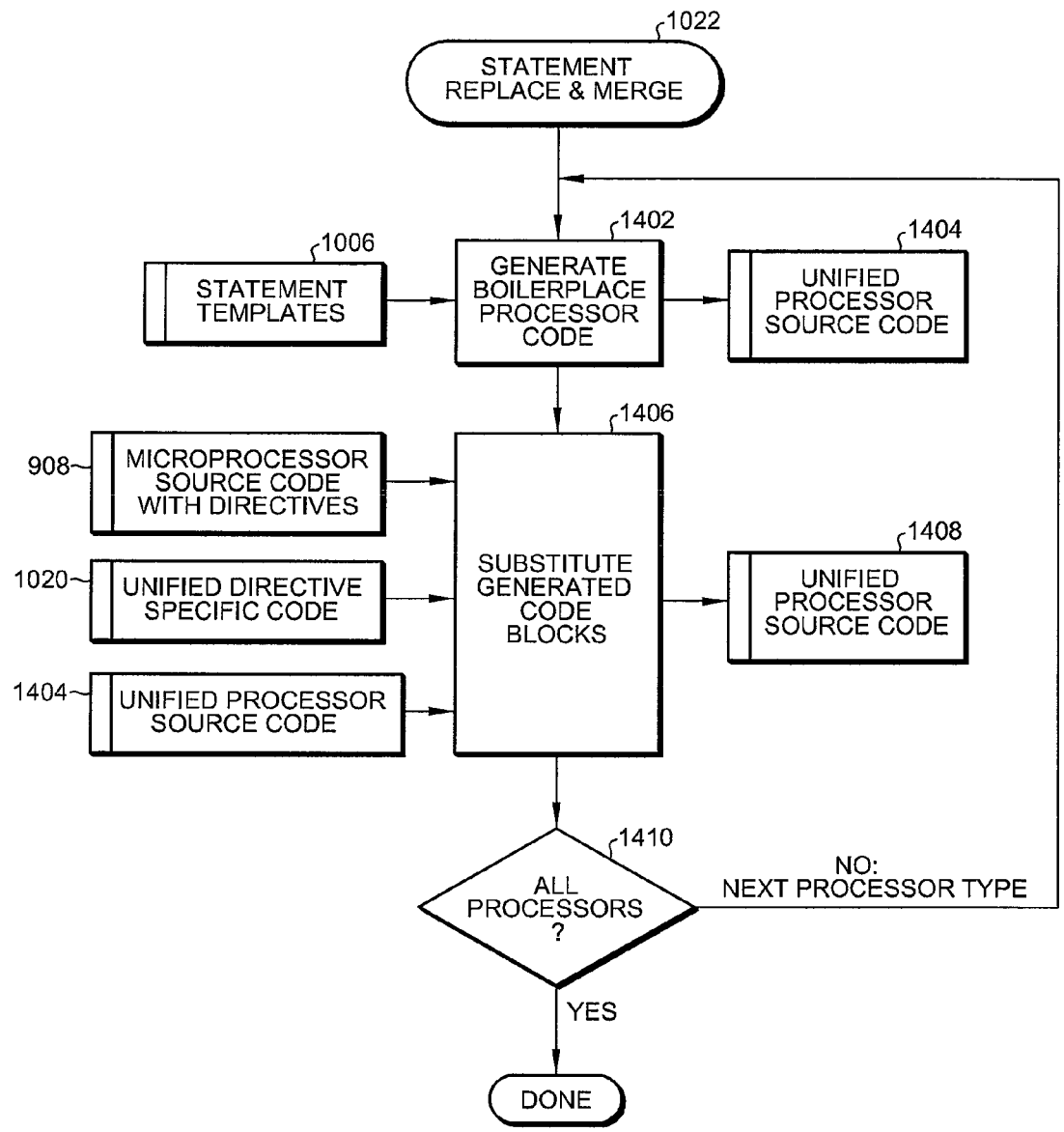
FIG. 14 is a process flow of the statement replace and merge process of the overall computational unification process flow.

With reference additionally now to FIG. 14, a process flow 1400 of the statement replace and merge process 1022 of the overall computational unification process is shown. Statement templates at data store step 1006 are acted upon at process step 1402 to produce unified process source code at data store step 1404. Together with the microprocessor source code with directives 908 and the unified directive specific code 1020, unified processor source code 1408 is produced by process step 1406. If all processors have not yet been addressed at decision step 1410, the process 1400 returns to step 1402. Otherwise, the process 1400 proceeds to the predefined processes of microprocessor source code compilation 1024 and other processor(s) source code compilation 1028 as shown in FIG. 10.

This process 1400 completes the in-order assemblage of unified source code. Appropriate boilerplate code is generated for each processor type and combined with the unified directive specific code statements generated in the previous step. Required sections of unmodified microprocessor source code statements are also extracted from the original source code and with the unified directive specific code statements generated in the previous step. The result is a set of unified source code files suitable for compilation and execution on a heterogeneous processor system.

Figure 15:
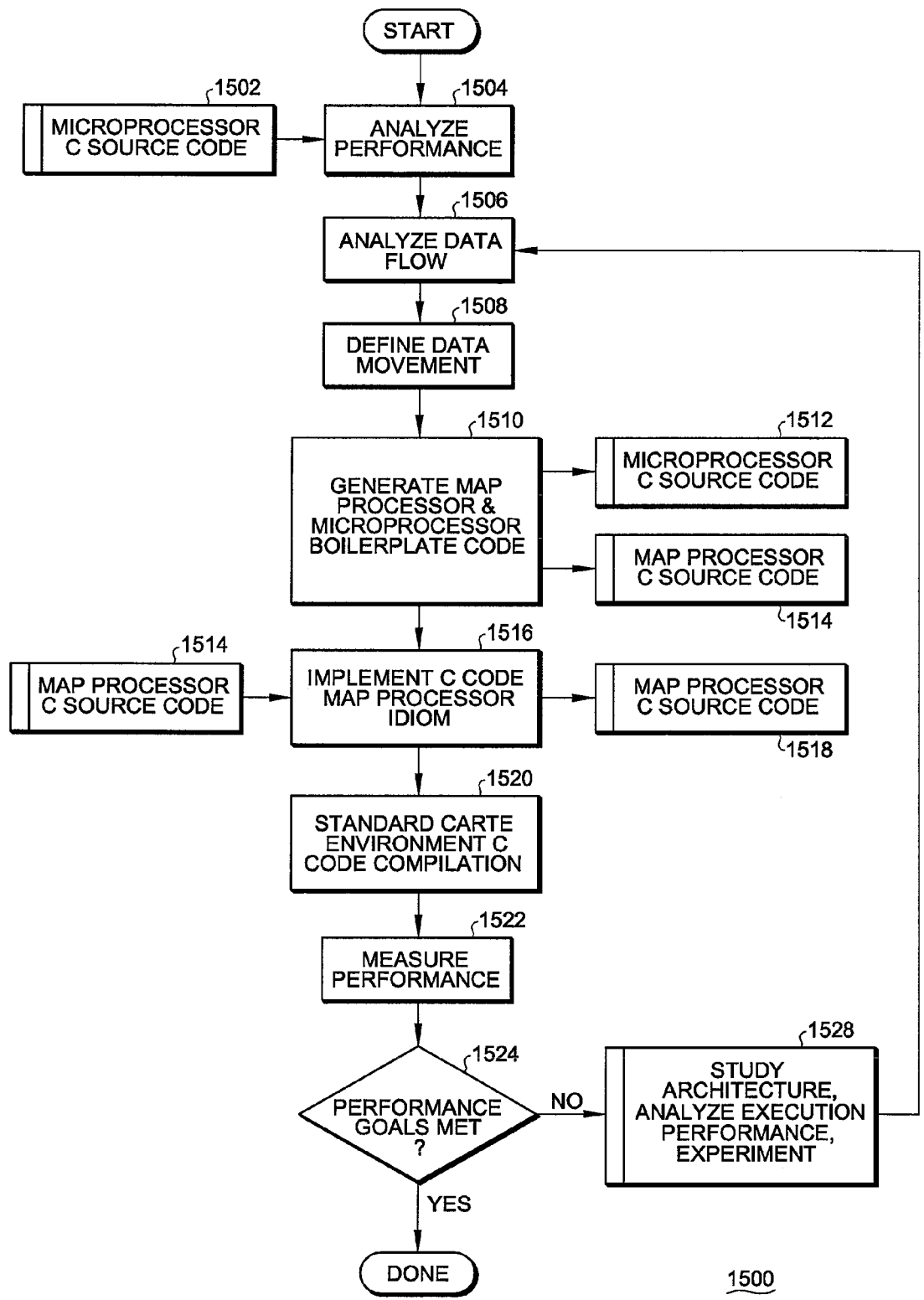
FIG. 15 is a process flow of the use-case comparison programmer process flow of the pre-computational unification process flow.

With reference additionally now to FIG. 15, a process flow 1500 of the use-case comparison programmer process flow of the pre-computational unification process of the present invention is shown. This process flow is a diagram of pre-computational unification program development for an SRC-7 heterogeneous computer system using the Carte development environment. In this exemplary embodiment, the SRC-7 system contains one microprocessor and one MAP processor.

A programmer analyzes the performance of their microprocessor C source code 1502 at step 1504, looking for a compute-intensive performance kernel. One is found, and the portion of the microprocessor source code representing that performance kernel is identified as the portion of code that will execute as a main program subroutine on the MAP processor. The remainder of the code, the main block and other subroutines, will execute on the microprocessor.

The programmer analyses the data flow at step 1506 within the identified MAP processor subroutine as well as the required data flow between the MAP processor and the microprocessor. This data flow analysis determines the required data movement between the two types of processors. From the data flow analysis, the defined data movement at step 1508 and expertise programming the SRC-7 system, the programmer generates microprocessor 1512 and MAP processor 1514 boilerplate code at process step 1510. At this point, the microprocessor code is complete, but the MAP processor code 1514 will not efficiently execute the code written for the microprocessor because the programming idiom in any computer language is specific to that processor type and does not necessarily directly translate into an efficient program. The programmer translates the microprocessor code statement's programming idiom into programming idiom appropriate for the MAP processor. The programmer uses their experience with the SRC-7, programming expertise and other resources in order to accomplish this task as illustrated by the process step 1516 to produce the MAP processor C source code at data store step 1518. The microprocessor and MAP processor source code programs the programmer created are then compiled using the Carte development environment as shown by defined process step 1520.

If the resulting measured performance at step 1522 does not meet the project's performance goals at decision step 1524, the programmer has to fall back into a contemplative state, ask questions, study the SRC-7 architecture in more depth, search for and locate execution performance bottlenecks and experiment further with the system as indicated by step 1526. This iterative searching for solutions in order to meet performance goals is very inefficient, leads to project schedule slippage, and is greatly dependent on the programmer's abilities. The computational unification process of the present invention solves this problem.

Figure 16:
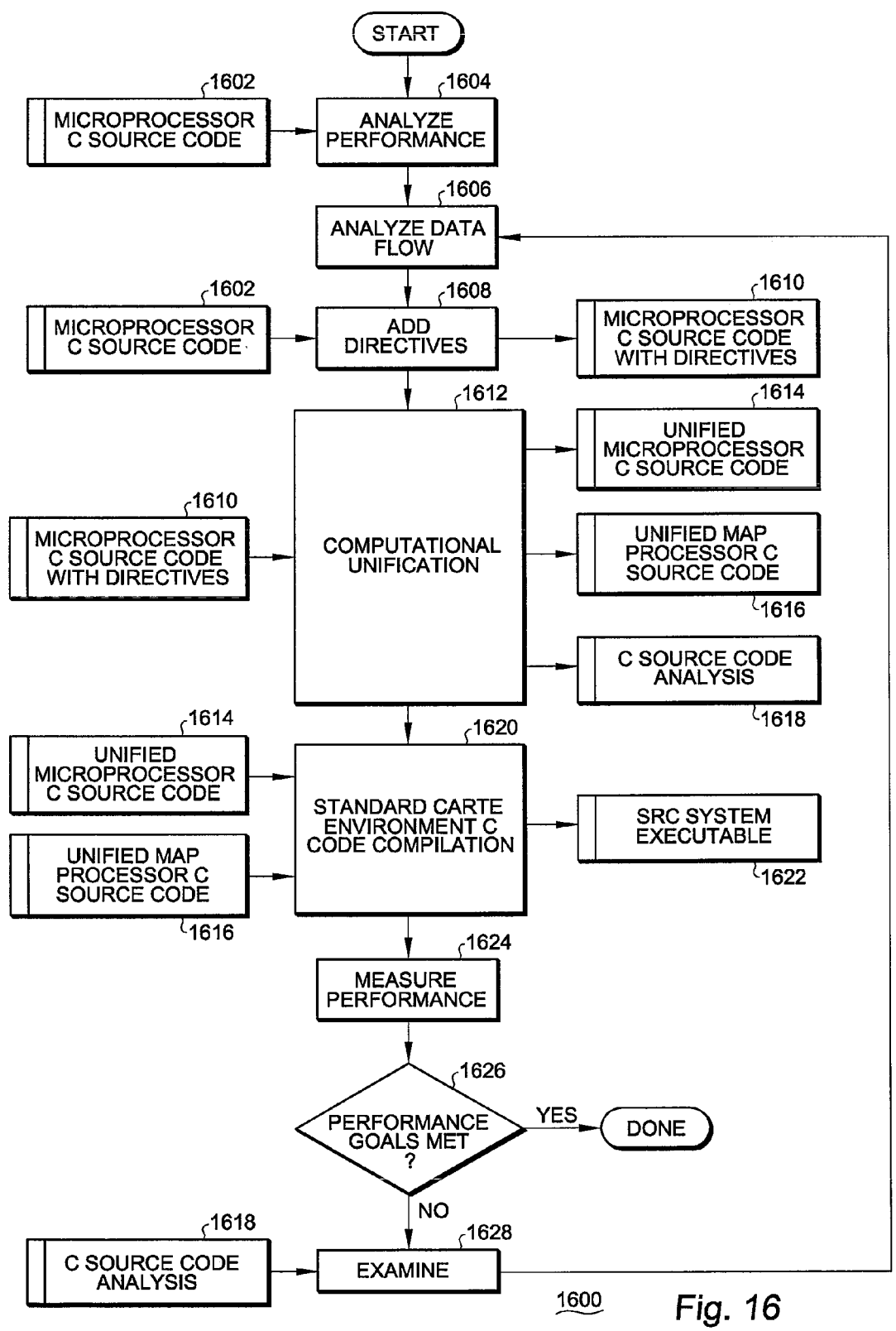
FIG. 16 is a process flow of the use-case comparison of the computational unification of the present invention process flow.

With reference additionally now to FIG. 16, a process flow 1600 of the use-case comparison of the computational unification process of the present invention is shown. The performance of the microprocessor C source code 1602 is analyzed at step 1604 and the data flow analyzed at step 1606. Directives are then added to the microprocessor C source code at step 1608 to produce microprocessor source code with directives at data store step 1610. Computational unification process step 1612 then operates on the microprocessor C source code with directives 1610 to produce unified microprocessor C source code 1614, unified MAP processor C source code 1616 and provide C source code analysis at data store step 1618. The unified microprocessor and MAP processor C source code 1614 and 1616 are then compiled in the standard Carte environment at predefined step 1620 to produce an SRC system executable at step 1622. Performance is then measured at step 1624 and if the performance goals are met, the process 1600 is completed. Otherwise, the C source code analysis 1618 is examined at step 1628 and the process 1600 returns to analyze the data flow at step 1606.

The unification process flow has two major differences when compared to the previous process flow of FIG. 15. First, the unified microprocessor and MAP processor source code files are generated automatically using directives the programmer inserted into the microprocessor source code file. The results of the performance and data flow analysis of the microprocessor source code steps is what directs the programmer to select appropriate computational unification directives. The second difference is the unification process supplies clear hints and suggestions to the programmer in the event the measured execution performance does not meet the project's performance goals.

While there have been described above the principles of the present invention in conjunction with specific systems and methods, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

As used herein, the terms "comprises", "comprising", or any other variation thereof, are intended to cover a non-exclusive inclusion, such that a process, method, article, or apparatus that comprises a recitation of certain elements does not necessarily include only those elements but may include other elements not expressly recited or inherent to such process, method, article or apparatus. None of the description in the present application should be read as implying that any particular element, step, or function is an essential element which must be included in the claim scope and THE SCOPE OF THE PATENTED SUBJECT MATTER IS DEFINED ONLY BY THE CLAIMS AS ALLOWED. Moreover, none of the appended claims are intended to invoke paragraph six of 35 U.S.C. Sect. 112 unless the exact phrase "means for" is employed and is followed by a participle.

What is claimed is:

1. A method for computationally unifying a heterogeneous computer system, the method performed by one or more processor comprising:
    adding directives to an implicit processor source code;
    analyzing and abstracting said implicit processor source code with said directives to produce statement templates, source code elements and directive parameters;
    generating directive based statements from said statement templates, source code elements and directive parameters to produce directive specific code;
    collecting directive based statements from said directive specific code to produce unified directive specific code; and
    statement replacing and merging said unified directive specific code and said implicit processor source code with said directives to produce unified implicit processor source code and unified explicit processor source code.

2. The method of claim 1 further comprising the steps of:
    compiling said unified implicit processor source code to produce an implicit processor executable; and
    also compiling said unified explicit processor source code to produce an explicit processor executable.

3. A computer program product, comprising a non-transitory computer usable medium having a computer readable program code embodied therein, said computer readable program code adapted to be executed to implement a method for computationally unifying a heterogeneous computer system comprising:
    computer readable program code configured to add directives to an implicit processor source code;
    computer readable program code configured to analyze and abstract said implicit processor source code with said directives to produce statement templates, source code elements and directive parameters;
    computer readable program code configured to generate directive based statements from said statement templates, source code elements and directive parameters to produce directive specific code;
    computer readable program code configured to collect directive based statements from said directive specific code to produce unified directive specific code; and
    computer readable program code configured to statement replace and merge said unified directive specific code and said implicit processor source code with said directives to produce unified implicit processor source code and unified explicit processor source code.

4. The computer program product of claim 3 further comprising:
    computer readable program code configured to compile said unified implicit processor source code to produce an implicit processor executable; and
    computer readable program code configured to also compile said unified explicit processor source code to produce an explicit processor executable.

* * * * *